(12) United States Patent
Matsumura et al.

(10) Patent No.: US 9,111,192 B2
(45) Date of Patent: Aug. 18, 2015

(54) RFID TAG

(71) Applicant: FUJITSU LIMITED, Kawasaki-shi, Kanagawa (JP)

(72) Inventors: Takayoshi Matsumura, Yokohama (JP); Noritsugu Osaki, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 115 days.

(21) Appl. No.: 13/955,207

(22) Filed: Jul. 31, 2013

(65) Prior Publication Data

US 2014/0034738 A1    Feb. 6, 2014

(30) Foreign Application Priority Data

Aug. 6, 2012  (JP) .................. 2012-174239

(51) Int. Cl.
G06K 19/00    (2006.01)
G06K 19/077   (2006.01)
G06K 19/02    (2006.01)

(52) U.S. Cl.
CPC ........ *G06K 19/07749* (2013.01); *G06K 19/025* (2013.01)

(58) Field of Classification Search
USPC ........................................ 235/492
See application file for complete search history.

(56) References Cited

FOREIGN PATENT DOCUMENTS

| DE | 10 2010 017 684 A1 | 1/2012 |
|---|---|---|
| JP | 08-034185 A | 2/1996 |
| JP | 2005-228226 A | 8/2005 |
| JP | 2008-052462 A | 3/2008 |
| WO | 2011/002440 A1 | 1/2011 |

OTHER PUBLICATIONS

European Search Report application No. 13177478.8 dated Dec. 6, 2013.

*Primary Examiner* — Daniel Hess
(74) *Attorney, Agent, or Firm* — Squire Patton Boggs (US) LLP

(57) ABSTRACT

There is provided an RFID tag which includes a first sheet portion including a first projection-depression portion formed in a longitudinal direction or a first groove portion formed in a direction forming an angle with the longitudinal direction, an antenna formed on a surface of the first sheet portion, the antenna being flexible and elastic, an integrated circuit chip electrically connected to the antenna, a second sheet portion including a second projection-depression portion formed in the longitudinal direction or a second groove portion formed in a direction forming an angle with the longitudinal direction, the antenna and the integrated circuit chip being covered between the first sheet portion and the second sheet portion, and a package member covering the first sheet portion and the second sheet portion, the package member being flexible and elastic.

9 Claims, 14 Drawing Sheets

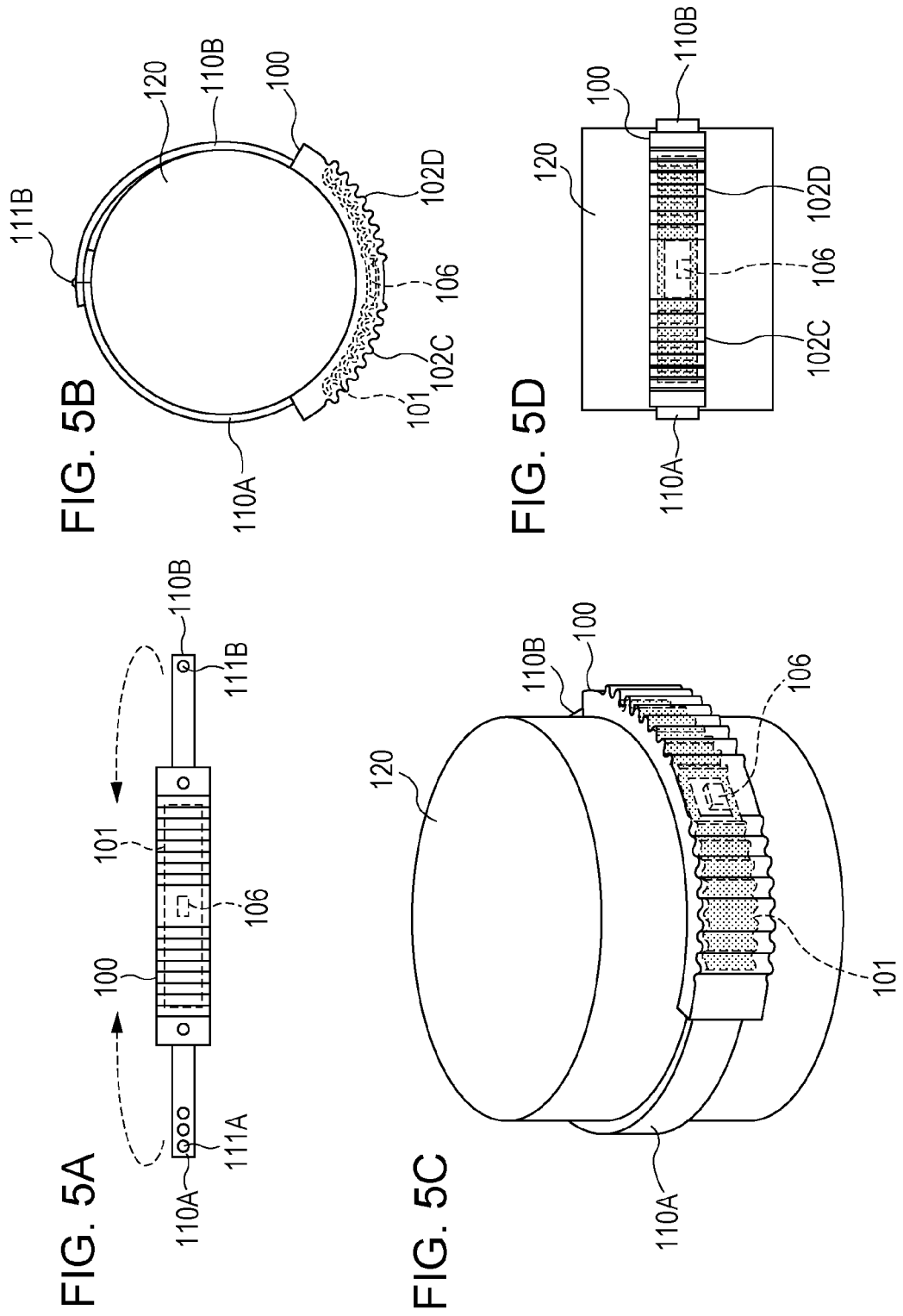

FIG. 13A
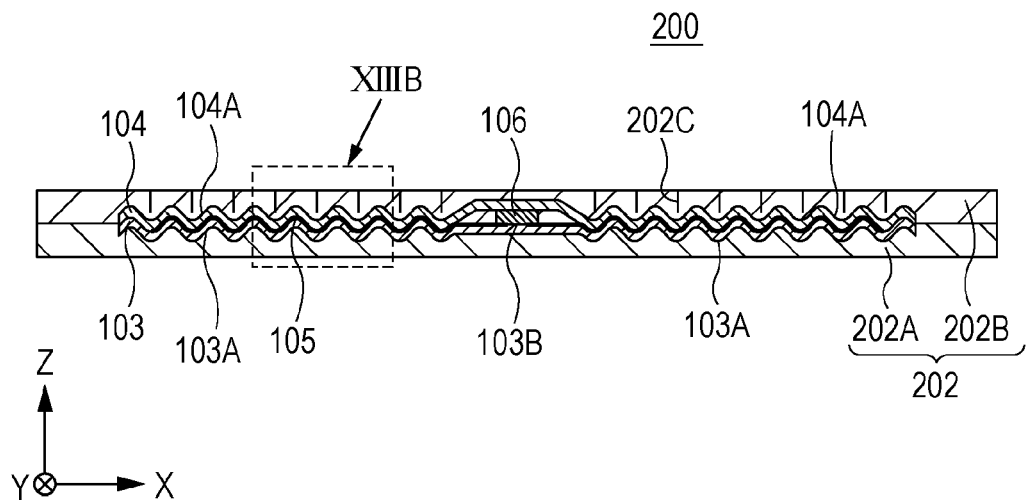
FIG. 13B
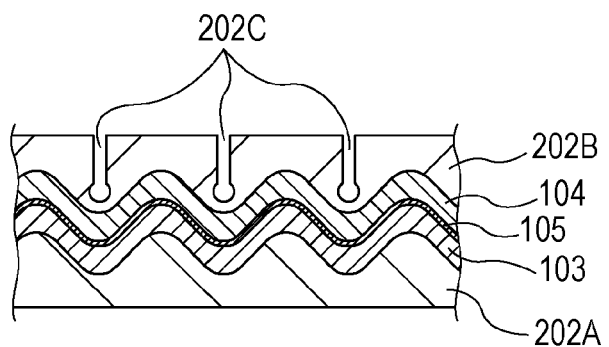
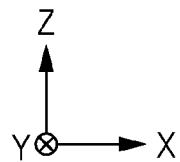

RFID TAG

CROSS-REFERENCE TO RELATED APPLICATION

This application is based upon and claims the benefit of priority of the prior Japanese Patent Application No. 2012-174239 filed on Aug. 6, 2012, the entire contents of which are incorporated herein by reference.

FIELD

The embodiments discussed herein are related to an RFID tag.

BACKGROUND

There are non-contact type ID cards, such as RFID cards, in which an antenna coil is disposed in the card main body. In such an ID card, the antenna coil has a wave shape in which multiple projections and depressions are formed in a thickness direction of the card main body (for example, see Japanese Laid-open Patent Publication No. 08-034185).

SUMMARY

According to an aspect of the invention, an RFID tag includes a first sheet portion including a first projection-depression portion formed in a longitudinal direction or a first groove portion formed in a direction forming an angle with the longitudinal direction, an antenna formed on a surface of the first sheet portion, the antenna being flexible and elastic, an integrated circuit chip electrically connected to the antenna, a second sheet portion including a second projection-depression portion formed in the longitudinal direction or a second groove portion formed in a direction forming an angle with the longitudinal direction, the antenna and the integrated circuit chip being covered between the first sheet portion and the second sheet portion, and a package member covering the first sheet portion and the second sheet portion, the package member being flexible and elastic.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 5A to 5D are views illustrating a fastened state of the RFID tag according to the first embodiment;

FIGS. 13A and 13B are views illustrating an RFID tag according to a second embodiment.

DESCRIPTION OF EMBODIMENTS

Unfortunately, there are cases where an ID card, as described in the background, is damaged when being affixed to a curved surface, in particular, an elastic curved surface. Thus, ID cards of this type are prone to being non-durable.

Therefore, a highly durable RFID tag is needed.

Hereinafter, a description will be given of a radio frequency identification (RFID) tag according to embodiments.

Before RFID tags of the embodiments are described, a disadvantage of an RFID tag of a comparative example will be described below.

Comparative Example

Figure 1A:
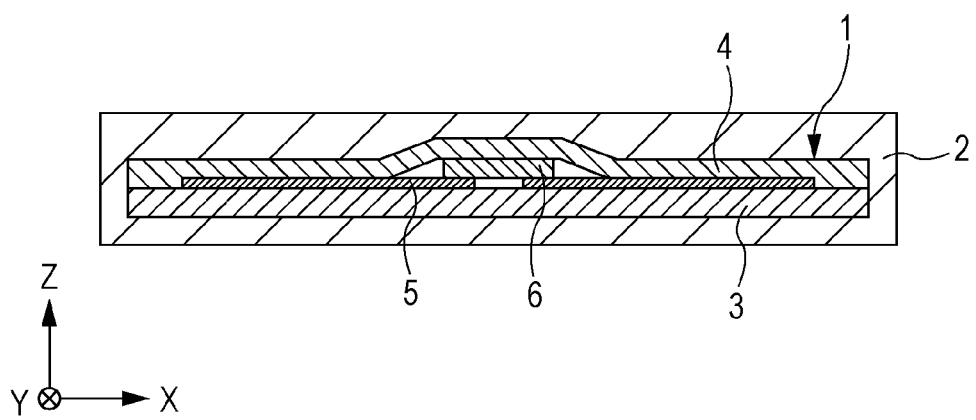
FIGS. 1A and 1B are views illustrating an RFID tag of a comparative example.
Figure 1B:
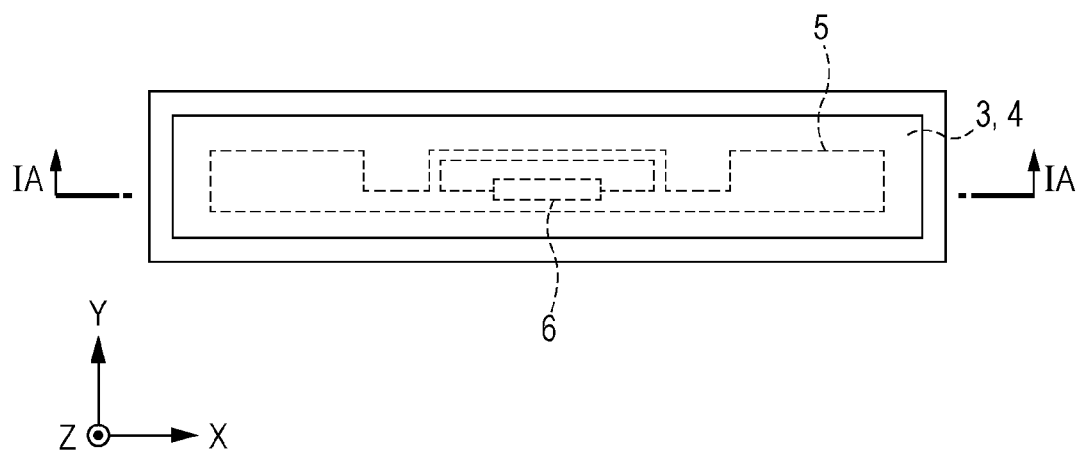

FIGS. 1A and 1B are views illustrating an RFID tag 10 of a comparative example; FIG. 1A is a cross section of the RFID tag 10, and FIG. 1B is a plan view of the RFID tag 10 given in a transparent manner. In more detail, FIG. 1A is a view illustrating the cross section taken along an arrow IA-IA of FIG. 1B. In FIGS. 1A and 1B, the dimensions of the RFID tag 10 are defined by an orthogonal coordinate system, more specifically, an XYZ coordinate system as illustrated in FIGS. 1A and 1B.

Hereinafter, in the drawings, a surface facing upward is defined as an "upper surface," and a surface facing downward is defined as a "lower surface." However, this definition is given so as to facilitate understanding the following explanation, and is not necessarily applicable to any given surfaces.

The RFID tag 10 of the comparative example includes an inlet 1 and a package 2. In more detail, the inlet 1 includes sheets 3 and 4, an antenna 5, and an IC chip 6, and the package 2 is made of rubber and covers the inlet 1.

Note that in FIG. 1B, the upper surface of the RFID tag 10 in FIG. 1A is illustrated in a transparent manner, and the upper half part of the package 2 and the sheet 4 are omitted.

Each of the sheets 3 and 4 is a polyethylene terephthalate (PET) film. The antenna 5 is used for communication, and is arranged on the upper surface of the sheet 3. The IC chip 6 is mounted on the upper surface of the sheet 3 and is electrically connected to the antenna 5, thereby enabling wireless communication to be conducted through the antenna 5. The sheet 4 is bonded to the upper surface of the sheet 3, thereby covering the antenna 5 and the IC chip 6 together with the sheet 3.

The package 2 is formed by bonding upper and lower separate pieces with thermal fusion processing, so that the package 2 covers the inlet 1.

Then, a description will be given of a disadvantage arising when the RFID tag 10 of the comparative example, as described above, is affixed to the curved surface of an article, with reference to FIGS. 2A to 2F.

Figure 2A:
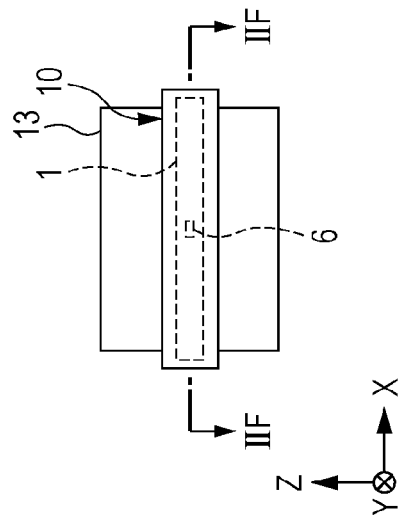
FIGS. 2A to 2F are views illustrating states in which the RFID tag of the comparative example is affixed to a curved surface of an article.

FIGS. 2A to 2F are views illustrating states in which the RFID tag 10 of the comparative example is affixed to the curved surface of an article. In FIG. 2A, the RFID tag 10 is affixed to the side surface of a cylindrical member 11 so as to encircle the side surface.

Figure 2C:
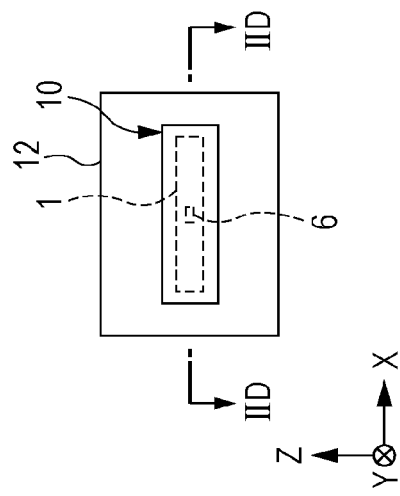
Figure 2E:
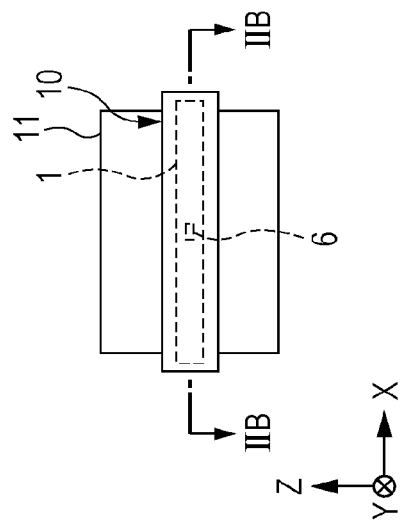
Figure 2B:
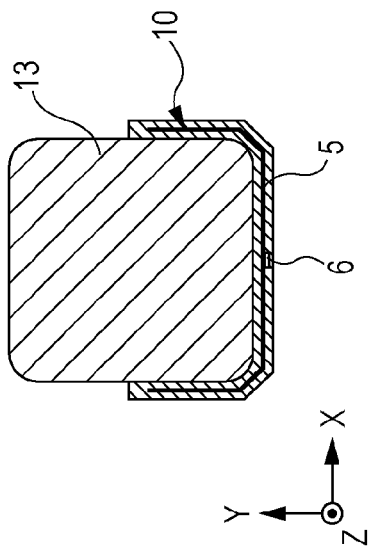

FIG. 2B is a cross-section view taken along an arrow IIB-IIB of FIG. 2A. When the RFID tag 10 is affixed to the curved surface of the cylindrical member 11 having a great curvature, as illustrated in FIG. 2B, the PET sheets 3 and 4 may fail to be bent along the curved surface and be broken. As a result, the inlet 1 would be damaged. In addition, the connecting portion of the antenna 5 and the IC chip 6 may also be damaged, so that the RFID tag 10 would be unable to operate.

FIG. 2C is a view illustrating a state where the RFID tag 10 is affixed to part of the side surface of a cylindrical member 12. FIG. 2E is a view illustrating a state where the RFID tag 10 is affixed to part of the side surface of a square-prism-shaped member 13. The square-prism-shaped member 13 is rounded at the four corners thereof.

Figure 2D:
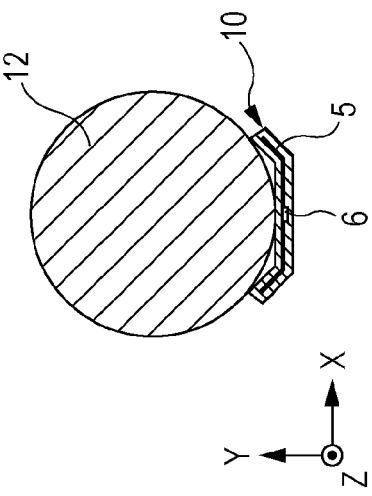
Figure 2F:
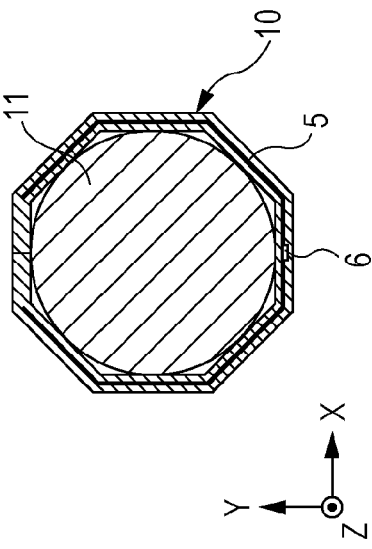

FIGS. 2D and 2F are cross-section views taken along arrows IID-IID and IIF-IIF of FIGS. 2C and 2E, respectively. When the RFID tag 10 is affixed to the curved surface, as illustrated in FIG. 2D or 2F, the PET sheets 3 and 4 may fail to be bent along the curved surface and be broken. As a result, the inlet 1 would be damaged. In addition, the connecting portion of the antenna 5 and the IC chip 6 may also be damaged, so that the RFID tag 10 would be unable to operate.

As described above, the RFID tag 10 of the comparative example may be damaged when being affixed to the curved surface of an article.

Even if the RFID tag 10 of the comparative example is not damaged upon being affixed to the curved surface of an article, when the article is deformed due to thermal expansion or shrinkage, there are cases where the RFID tag 10 fails to absorb this deformation and is damaged.

Thus, the RFID tag 10 of the comparative example has a disadvantage in terms of durability.

Therefore, the embodiments that will be described below aim to provide a highly durable RFID tag.

First Embodiment

Figure 3A:
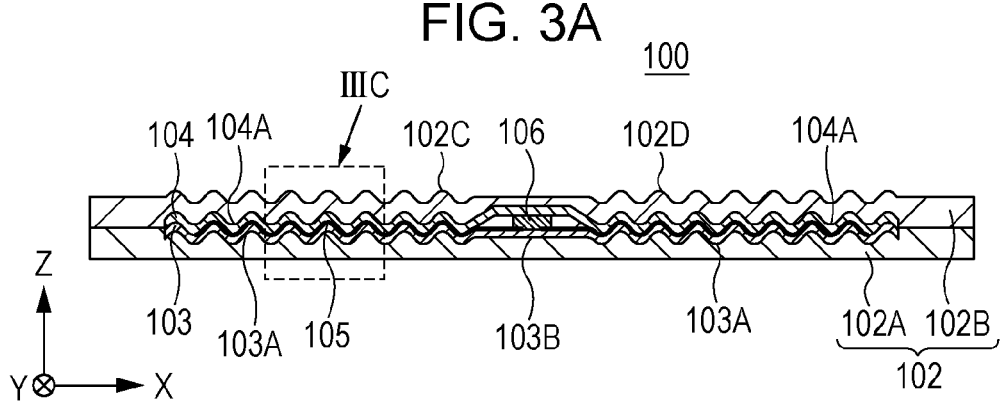
FIGS. 3A to 3C are views illustrating an RFID tag according to a first embodiment.
Figure 3B:
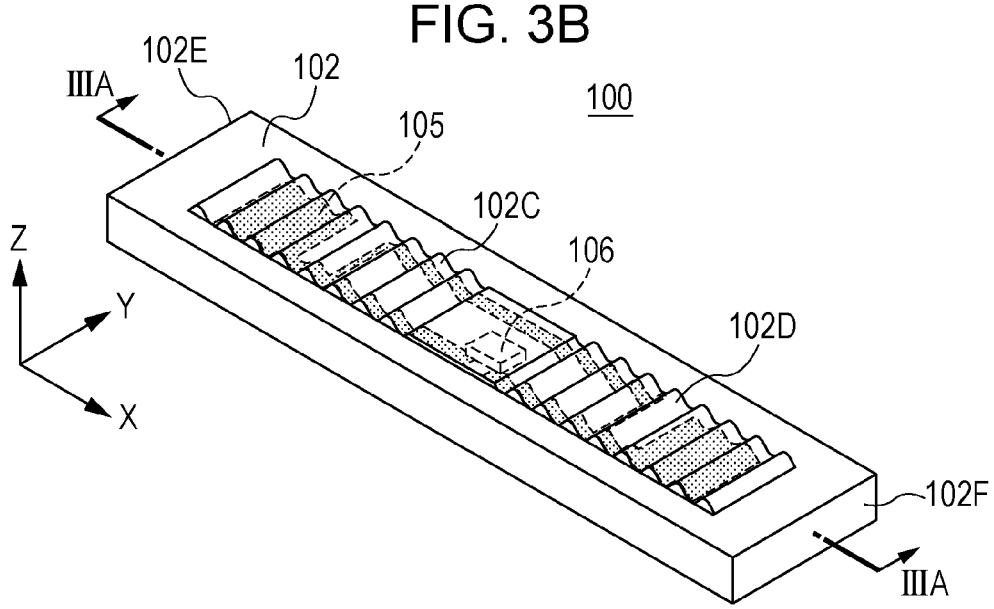
Figure 3C:
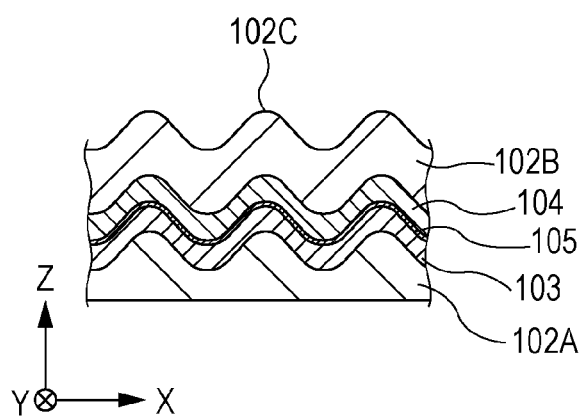

FIGS. 3A to 3C are views illustrating an RFID tag 100 according to a first embodiment. Specifically, FIG. 3A is a cross-section view of the whole of the RFID tag 100; FIG. 3B is a perspective view of the RFID tag 100; and FIG. 3C is an enlarged view of part surrounded by a dotted line IIIC of FIG. 3A. FIG. 3A is a cross-section view taken along an arrow IIIA-IIIA of FIG. 3B. In FIGS. 3A to 3C, the dimensions of RFID tag 100 are defined by an orthogonal coordinate system, more specifically, an XYZ coordinate system.

The RFID tag 100 according to the first embodiment includes an inlet 101 and a package 102. The inlet 101 includes sheets 103 and 104, an antenna 105, and an IC chip 106. In the RFID tag 100, the lower surface of the package 102 is to be affixed to an article.

The inlet 101 is processed into a wave shape in a longitudinal direction thereof (or in an X-axial direction in FIGS. 3A to 3C), except for a middle portion in the longitudinal direction on which the IC chip 106 is mounted. The portion processed into a wave shape in the longitudinal direction is an example of a projection-depression portion formed in the longitudinal direction. In order to process the inlet 101 into a wave shape in this manner, thermal processing is used. Note that a method of forming the inlet 101 will be described later.

Each of the sheets 103 and 104 is a polyethylene terephthalate (PET) film processed into a wave shape in a longitudinal direction thereof (or in the X-axial direction in FIGS. 3A to 3C). Note that although the sheets 103 and 104 are omitted from the perspective view of FIG. 3B for better viewability, wave portions 102C and 102D on the upper surface of the package 102 correspond to the wave portions of the sheets 103 and 104. The wave portions 102C and 102D are an example of a third projection-depression portion.

The sheet 103 is an example of a first sheet portion, and the sheet 104 is an example of a second sheet portion. Wave-shaped processed portions 103A on the sheet 103 are an example of a first projection-depression portion formed in the longitudinal direction. Wave-shaped processed portions 104A on the sheet 104 are an example of a second projection-depression portion formed in the longitudinal direction.

The wave-shaped processed portions 103A and 103A on the sheet 103 have the same wave phase as the wave-shaped processed portions 104A and 104A on the sheet 104 does. In other words, the wave phase of the wave-shaped processed portions 103A and 103A on the sheet 103 corresponds to that of the wave-shaped processed portions 104A and 104A on the sheet 104.

The sheet 103 includes the two wave-shaped processed portions 103A and 103A, and a flat portion 103B provided therebetween.

The antenna 105 and the IC chip 106 are mounted on the upper surface of the sheet 103. The IC chip 106 is mounted on the flat portion 103B. The wave shapes of the sheets 103 and 104 are processed by: for example, mounting the antenna 105 and the IC chip 106 on the upper surface of the flat sheet 103; bonding the sheet 104 to the upper surface of the flat sheet 103 so as to cover the antenna 105 and the IC chip 106, thereby forming the flat inlet 101; and subjecting the flat inlet 101 to thermal processing. Note that the sheets 103 and 104 may be bonded to each other with, for example, an acrylic adhesive tape.

Each of the sheets 103 and 104 may also be any other film instead of a PET film, such as a polypropylene film or a vinyl chloride film.

The antenna 105 is formed on one surface (or the upper surface) of the sheet 103, and may be made of, for example, a silver paste. The silver paste may be produced by mixing a thermosetting resin and a silver powder. The silver paste is applied to the surface of the sheet 103, and is cured by means of heat, so that the antenna 105 is formed.

Note that the pattern of the antenna 105 in a planar view will be described later, with reference to FIGS. 4A to 4D.

The IC chip 106 is mounted on a surface of a base portion 110 and is electrically connected to the antenna 105. The IC chip 106 is mounted on the surface of the sheet 103 with, for example, an underfill material.

Once the IC chip 106 receives a read signal of a radio frequency (RF) band from a reader/writer for the RFID tag 100 through the antenna 105, the IC chip 106 is activated by electricity of the received signal, and transmits identification information through the antenna 105. In response, the reader/writer reads the identification signal from the RFID tag 100.

The package 102 includes a lower side portion 102A and an upper side portion 102B, which are arranged so as to cover the lower and upper sides, respectively, of the inlet 101 processed into a wave shape. Each of the lower side portion 102A and the upper side portion 102B is larger than the inlet 101 in a planar view. The respective parts of the lower side portion 102A and the upper side portion 102B which surround the inlet 101 are thermally fused so as to be joined together. In this manner, the package 102 entirely covers the inlet 101.

The lower side portion 102A of the package 102 may be subjected to pre-processing, through which part of the upper surface thereof, which is to be brought into contact with the sheet 103, is formed in a wave shape in accordance with the wave shape of the sheet 103 and the lower surface thereof is formed to be flat. Alternatively, the lower side portion 102A may be a flat rubber sheet, as long as the rubber sheet is elastic and flexible enough to absorb the projections and depressions of the wave shape of the sheet 103. In this case, out of the flat rubber sheet used as the lower side portion 102A, only part which makes contact with the sheet 103 includes a wave shape.

The lower surface of the lower side portion 102A is to be affixed to an article which is identified with the RFID tag 100. The package 102 includes end portions 102E and 102F arranged at either end in the longitudinal direction.

Likewise, the upper side portion 102B of the package 102 may be subjected to pre-processing, through which part of the upper surface thereof, which is to be brought into contact with the sheet 104, is formed in a wave shape in accordance with the wave shape of the sheet 104 and the lower surface thereof is formed to be flat. Alternatively, the upper side portion 102B may be a flat rubber sheet, as long as the rubber sheet is elastic and flexible enough to absorb the projections and depressions of the wave shape of the sheet 104. In this case, out of the flat rubber sheet used as the upper side portion 102B, only part which makes contact with the sheet 104 includes a wave shape.

The package 102, as described above, may be made of any given material having flexibility and elasticity. For example, the package 102 may be a member having entropic elasticity. The meaning of "entropic elasticity" includes, for example, rubber elasticity and elastomeric elasticity. Accordingly, a rubber material having rubber elasticity or an elastomeric material having elastomeric elasticity may be used.

Examples of the rubber material include, but are not limited to, a silicone (silica ketone) rubber, a butyl rubber, a nitryl rubber, a hydrogenation nitryl rubber, a fluorocarbon rubber, an epichlorohydrin rubber, an isoprene rubber, a chlorosulfonated polyethylene rubber, and a polyurethane rubber.

Examples of the elastomeric material include, but are not limited to, vinyl chloride, styrene, olefin, ester, urethane, and amidic elastomeric materials.

Figure 4A:
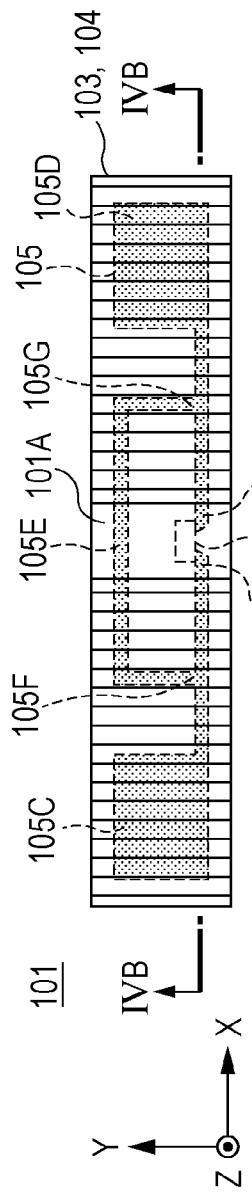
FIGS. 4A to 4D are views illustrating an inlet of the RFID tag according to the first embodiment.
Figure 4B:
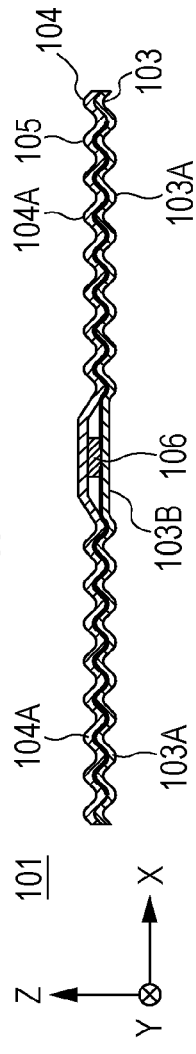
Figure 4C:
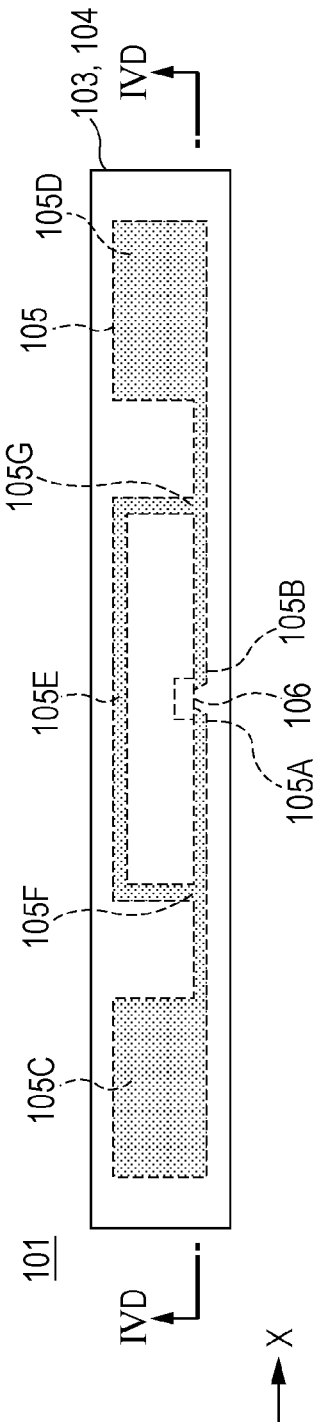
Figure 4D:
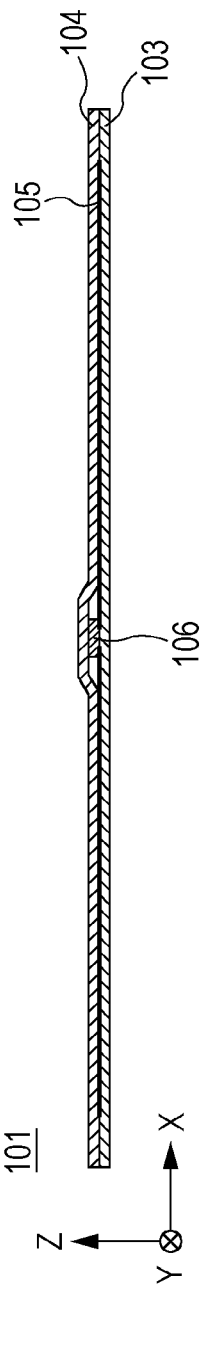

FIGS. 4A to 4D are views illustrating the inlet 101 of the RFID tag 100 according to the first embodiment. Specifically, FIG. 4A is a view of the upper surface of the inlet 101; FIG. 4B is a cross-section view of the inlet 101; FIG. 4C is a view of the upper surface of the inlet 101 before it is processed into a wave shape; and FIG. 4D is a cross-section view of the inlet 101 before it is processed into a wave shape. In more detail, FIG. 4B is a cross section view taken along an arrow IVB-IVB of FIG. 4A, and FIG. 4D is a cross section view taken along an arrow IVD-IVD in FIG. 4C.

As illustrated in FIGS. 4A and 4B, the inlet 101 includes the sheets 103 and 104, the antenna 105, and the IC chip 106. The inlet 101 includes a middle portion 101A located in the middle thereof in a longitudinal direction of the inlet 101 (or in an X-axial direction of FIG. 4A), and the middle portion 101A includes a flat shape, namely, is not processed into a wave shape, in order to allow the IC chip 106 to be mounted thereon.

The antenna 105 includes connection terminals 105A and 105B that are connected to the IC chip 106, end portions 105C and 105D, and a connection portion 105E.

The connection terminals 105A and 105B are not connected to each other, but are connected to corresponding terminals formed on the lower surface of the IC chip 106. The IC chip 106 is mounted on the surface of the sheet 103 with, for example, an underfill material, so that the connection terminals 105A and 105B are connected to the terminals of the IC chip 106.

Each of the end portions 105C and 105D includes a rectangular shape in a planar view. The end portions 105C and 105D are connected to the connection terminals 105A and 105B, respectively, by corresponding linear patterns.

One end of the connection portion 105E is connected to a connection node 105F between the connection terminal 105A and the end portion 105C, whereas the other end of the connection node 105G is connected to a connection node 105G between the connection terminal 105B and the end portion 105D. The connection portion 105E is patterned in a U-shape between the connection nodes 105F and 105G.

The length of the antenna 105 may be set in accordance with a frequency to be used in wireless communication conducted by the RFID tag 100. For example, since a frequency band of 952 MHz to 954 MHz or 2.45 GHz is assigned to a frequency for RFID tags in Japan, the length of the antenna 105 between the end portions 105C and 105D through the connection terminals 105A and 105B may be set to ½ of a wavelength λ, of the used frequency. Likewise, since frequency bands of 915 MHz and 868 MHz are assigned as typical frequencies in the USA and the EU, respectively, the length of the antenna 105 may be set to ½ of a wavelength λ, of either of these used frequencies. Note that the length of the antenna 105 may also be defined as that between the end portions 105C and 105D through the connection portion 105E.

FIGS. 4C and 4D illustrate upper and side surfaces, respectively, of the inlet 101, before it is processed into a wave shape. The inlet 101 illustrated in FIG. 4C or 4D is about 1.5 times as long as that illustrated in FIG. 4A or 4B, because the length of the inlet 101 is decreased by being processed into a wave shape. Note that a method of processing the inlet 101 into a wave shape will be described later.

Next, a description will be given of a state in which the RFID tag 100 is fastened to an article having a curved surface, with reference to FIGS. 5A to 5D.

FIGS. 5A to 5D are views illustrating a fastened state of the RFID tag 100 according to the first embodiment.

In this embodiment, as illustrated in FIG. 5A, bands 110A and 110B are attached to both sides of the RFID tag 100 in a longitudinal direction of the RFID tag 100. The bands 110A and 110B are provided with a hole IIIA and a button IIIB, respectively. By attaching or inserting the button IIIB to the hole IIIA, the bands 110A and 110B form a loop.

In FIGS. 5B to 5D, the RFID tag 100 is fastened to a cylindrical article 120 by the bands 110A and 110B, with the attached surface of the RFID tag 100 being in contact with the side surface of the cylindrical article 120. Specifically, FIG. 5B is a view of the upper surface of the RFID tag 100 fastened to the article 120; FIG. 5C is an enlarged perspective view of the RFID tag 100; and FIG. 5D is a side view thereof.

As illustrated in FIGS. 5B to 5D, when the RFID tag 100 is fastened to the curved side surface of the cylindrical article 120, the inlet 101 is bent so as to fit the curved side surface. Thus, the damaging of the inlet 101 is suppressed. In this state, the PET sheets 103 and 104 are also bent so as to fit the curved side surface of the article 120. Since the sheets 103 and 104 are processed into a wave shape, they are able to be bent and fit a curved surface more easily than sheets that are not processed into a wave shape.

Moreover, since the antenna 105 is made of an Ag paste, as described above, it is less prone to being damaged even when being bent in conjunction with the sheets 103 and 104.

When the inlet 101 is bent in the above manner, the IC chip 106 slightly becomes separated from the side surface of the article 120 due to the projections and depressions of each wave shape of the sheets 103 and 104. As a result, the stress transferred from the lower side portion 102A of the package 102 to the IC chip 106 is decreased. For this reason, damaging of the connection portions of the antenna 105 and the IC chip 106 are suppressed.

The package 102 is made of rubber, as described above. Therefore, even when the inlet 101 is bent as illustrated in FIGS. 5A to 5D, the package 102 is not affected at all.

As described above, the inlet 101 including the sheets 103 and 104 is configured to be bent so as to fit the side surface of the cylindrical article 120. Consequently, it is possible for the RFID tag 100 according to the first embodiment to be fastened to a curved surface without being damaged.

Next, a description will be given of a case where the RFID tag 100 is bent and formed into a circular shape by connecting both ends thereof disposed in the longitudinal direction, with reference to FIGS. 6A to 6C.

Figure 6B:
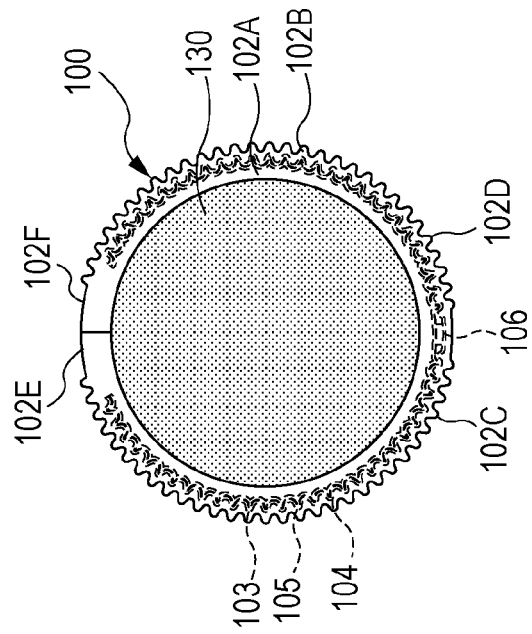
FIGS. 6A to 6C are views illustrating another fastened state of the RFID tag according to the first embodiment.
Figure 6C:
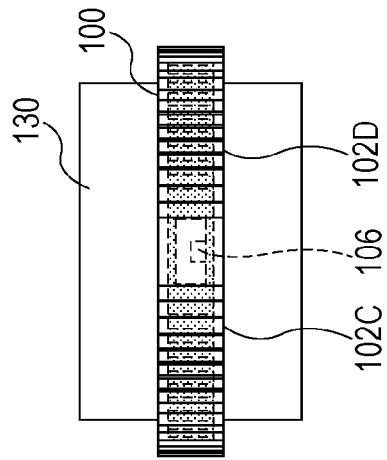
Figure 6A:
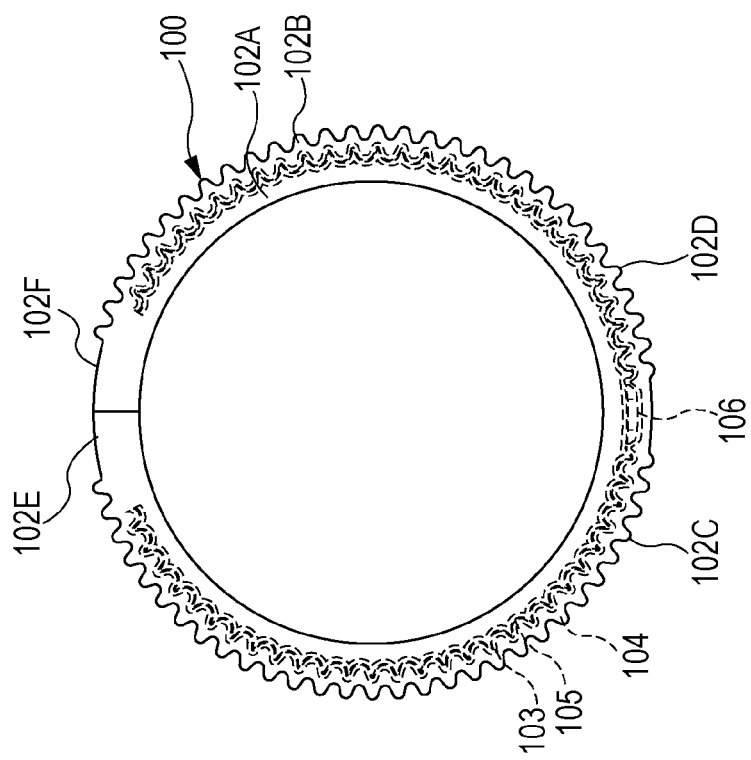

FIGS. 6A to 6C are views illustrating another fastened state of the RFID tag 100 according to the first embodiment. Specifically, FIG. 6A is a view of the upper surface of the RFID tag 100 having a circular shape; FIG. 6B is a view of the upper surface of the circular RFID tag 100 in a fastened state; and FIG. 6C is a side view thereof.

As illustrated in FIG. 6A, the RFID tag 100 is formed into a circular shape by connecting the end portions 102E and 102F which are arranged at either end of the RFID tag 100 in the longitudinal direction. The end portions 102E and 102F may be connected with an acrylic adhesive tape.

The RFID tag 100 that forms a circular shape in the above manner is fastened to the side surface of a cylindrical article 130, as illustrated in FIGS. 6B and 6C.

When the RFID tag 100 is fastened to the side surface of the cylindrical article 130, the sheets 103 and 104 of the inlet 101 in the RFID tag 100 are bent along the curved surface without being damaged, similar to the case illustrated in FIGS. 5A to 5D. Furthermore, neither of the antenna 105 and the IC chip 106 are damaged or affected. Likewise, the package 102, made of rubber, is not affected at all even when being bent as illustrated in FIGS. 6A to 6C.

The inlet 101 including the sheets 103 and 104 is configured to be bent in the above manner. Therefore, it is possible for the RFID tag 100 according to the first embodiment to be fastened to the curved side surface of the cylindrical article 130 and fit the curved surface while being formed into a circular shape by connecting both ends of the RFID tag 100 which are arranged in the longitudinal direction.

As described above, the first embodiment may make it possible to provide a highly durable RFID tag.

In the above description, when the RFID tag 100 is fastened to a curved surface, such as the side surface of the cylindrical article 120 or 130, the RFID tag 100 is bent into an arc or circular shape. Here, the articles 120 and 130 are not deformed, and therefore the dimensions and sizes of their side surfaces are fixed.

Meanwhile, when fastened to an elastic curved surface, the RFID tag 100 may expand or shrink in the longitudinal direction, in addition to being bent.

To give an example, it is assumed that an RFID tag which is not processed into a wave shape, such as that of the comparative example, is fastened to the curved surface of an elastic article. When the article expands or shrinks, the RFID tag may fail to absorb the deformation of the article which is caused by the expansion or shrinkage. In this case, the RFID tag is prone to being damaged.

To give another example, it is assumed that the RFID tag 100 according to the first embodiment is fastened to the curved surface of an elastic article. When the article expands or shrinks, the RFID tag 100 successfully absorbs the deformation caused by the expansion or shrinkage via deformation of the inlet 101 processed into a wave shape, as long as the expansion or shrinkage occurs in a longitudinal direction of the RFID tag 100. Consequently, the first embodiment makes it possible to provide a highly durable RFID tag that is capable of being fastened to the curved surface of an elastic article.

The cause of the deformation, expansion or shrinkage of an article is considered to be surrounding heat, an external stress, or the like.

Next, a description will be given of a method of processing the inlet 101 into a wave shape, with reference to FIGS. 7A to 7G.

FIGS. 7A to 7G are views illustrating processing steps subjected to the inlet 101 of the RFID tag 100 according to the first embodiment. Specifically, FIGS. 7A to 7C and FIGS. 7D to 7G illustrate different processes. Note that in FIGS. 7A to 7G, the inlet 101 is illustrated simplistically.

Figure 7A:
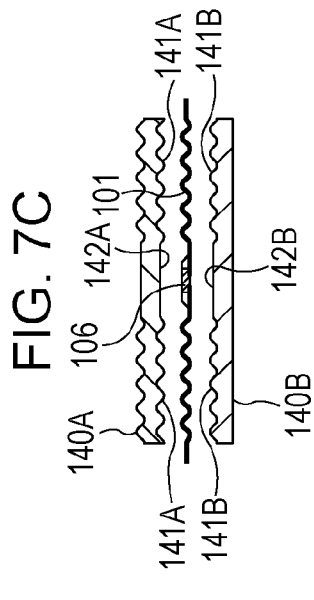
FIGS. 7A to 7G are views illustrating processing steps subjected to the inlet of the RFID tag according to the first embodiment.
Figure 7B:
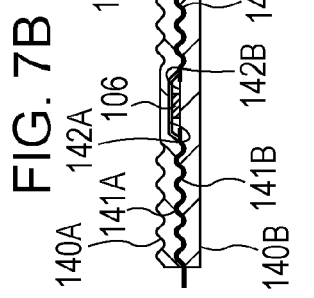
Figure 7C:
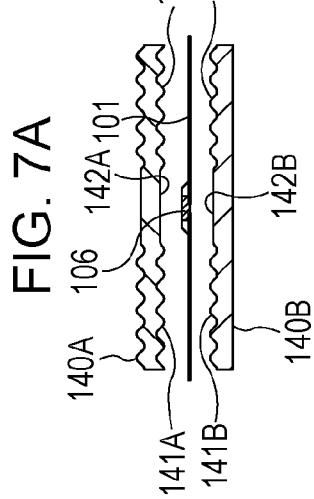

At the step of FIG. 7A in the process of FIGS. 7A to 7C, jigs 140A and 140B are used. The jig 140A includes two wave portions 141A and 141A and a flat portion 142A. The flat portion 142A is located between the wave portions 141A and 141A. The jig 140B includes wave portions 141B and 141B and a flat portion 142B. The flat portion 142B is located between the wave portions 141B and 141B.

The wave portions 141A and 141A of the jig 140A includes the same wave phase as the wave portions 141B and 141B of the jig 140B. When the jigs 140A and 140B are abutted against each other, the flat portions 142A and 142B are arranged to oppose each other while being separated by a distance defined by totaling the individual thicknesses of the sheets 103 and 104, the antenna 105 and the IC chip 106, and a predetermined margin.

The flat portion 142A is located on the same level as the top of the wave portions 141A and 141A, and the flat portion 142B is located on the same level as the top of the wave portions 141B and 141B.

As illustrated in FIG. 7A, the inlet 101 is set between the jigs 140A and 140B. In more detail, the inlet 101 is set such that the IC chip 106 is located between the flat portions 142A and 142B and the sheets 103 and 104 (see FIG. 3A) are arranged on the upper and lower sides, respectively. In this case, the jigs 140A and 140B are preheated at a predetermined temperature, such as 60° C.

Then, as illustrated in FIG. 7B, the inlet 101 is sandwiched and pressed by the jigs 140A and 140B while the temperature of the jigs 140A and 140B is maintained. Through this step, the inlet 101 is subjected to thermal and pressurizing treatments at the same time. At the step of FIG. 7B, the treatment time and pressure may be optimized in accordance with, for example, the individual thicknesses of the sheets 103 and 104 in the inlet 101.

Finally, as illustrated in FIG. 7C, the jigs 140A and 140B are separated, and then the inlet 101 that has been processed into a wave shape is taken out from the jigs 140A and 140B. Through the above steps, the fabrication of the wave-shaped inlet 101 is completed.

In FIG. 7A, each of the flat portions 142A and 142B is located on the same level as the top of the corresponding wave shape, as described above. With the jigs 140A and 140B configured above, a sufficient distance is able to be secured between the article and the IC chip 106, when a surface of the RFID tag 100 which is closer to the sheet 103 of the inlet 101 is affixed to an article. Consequently, a stress applied to the IC chip 106 which is generated when the RFID tag 100 is bent is decreased.

Alternatively, each of the flat portions 142A and 142B of the jigs 140A and 140B, respectively, may be located at the middle position of the top and bottom of the corresponding wave shape. In this case, a distance is able to be secured between the IC chip 106 and the upper surface of the inlet 101 (or the sheet 104).

Moreover, each of the flat portions 142A and 142B may also be located on the same level as the bottom of the corresponding wave shape. In sum, the heights of the flat portions 142A and 142B may be set as appropriate in accordance with, for example, the application of the RFID tag 100.

Figure 7D:
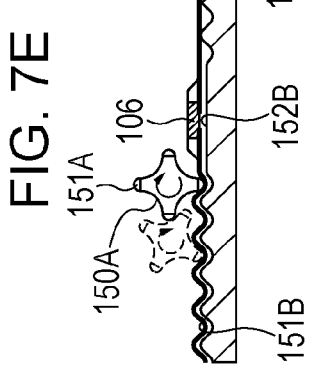
Figure 7E:
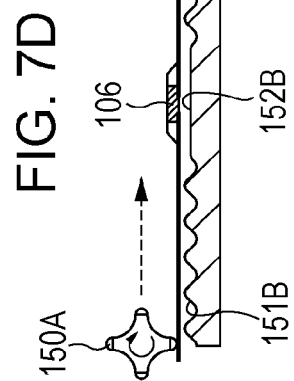
Figure 7F:
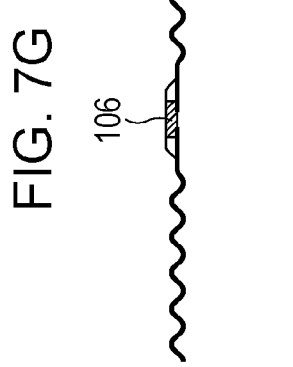

On the other hand, in the processing step of FIG. 7D to 7F, first, jigs 150A and 150B are used as illustrated in FIG. 7D. Note that the jigs 150A and 150B are preheated.

The jig 150A is provided with four projections 151A, and is retained so as to be rotatable along the upper surface of the jig 150B. The projections 151A of the jig 150A are formed so as to correspond to the shape of two wave portions 151B of the jig 150B.

The jig 150B is provided with the wave portions 151B and 151B and a flat portion 152B. The flat portion 152B is located between the wave portions 151B and 151B preferably at a central region between the wave portions 151B and 151B.

As illustrated in FIG. 7D, first, the inlet 101 is set on the jig 150B, and the jig 150A is rotated and moved from the left location of FIG. 7D to a location illustrated in FIG. 7E. In other words, the jig 150A is rotated and moved to a location in front of the flat portion 152B.

Then, the jig 150A is temporarily lifted so as to become separated from the jig 150B, and moved to the opposite end of the inlet 101 in a longitudinal direction of the inlet 101 (or on the right side of FIG. 7F), as illustrated in FIG. 7F. Followed by, the jig 150A is rotated and moved from the opposite end to a location in front of the flat portion 152B, so that the processing is subjected to a region from the opposite end to the front location.

Figure 7G:
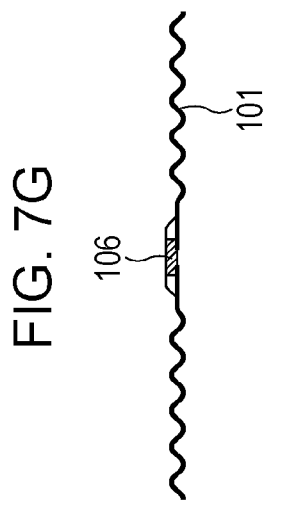

Through the above steps, the inlet 101 is able to be processed into a wave shape, as illustrated in FIG. 7G.

Next, a description will be given of a wave shape of the inlet 101, and an allowable expansion and shrinkage rate of the inlet 101 in a longitudinal direction thereof, with reference to FIGS. 8 to 11A and 11B.

Figure 8:
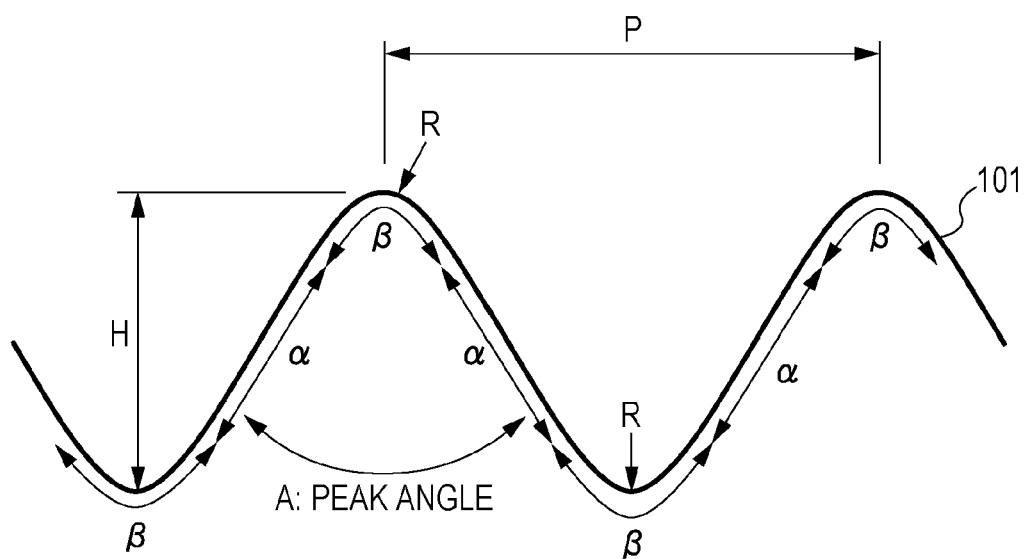
FIG. 8 is an explanatory view of a wave shape of the RFID tag according to the first embodiment.
Figure 9A:
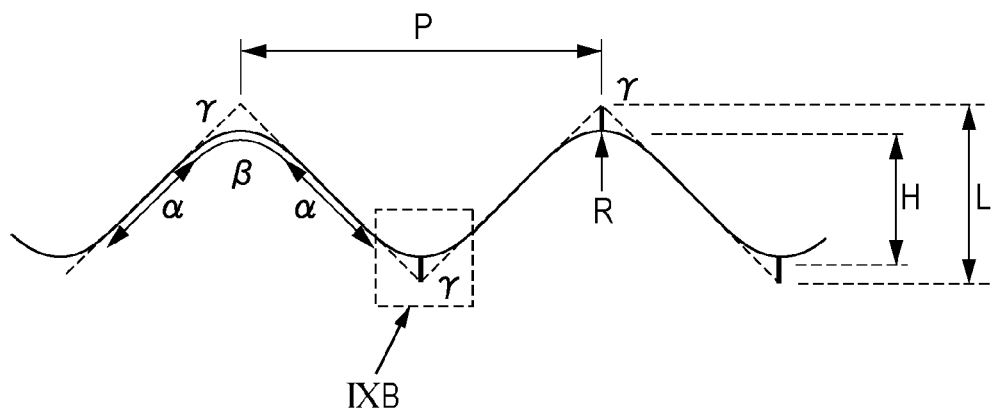
FIGS. 9A and 9B are explanatory views of the wave shape of the RFID tag according to the first embodiment.
Figure 9B:
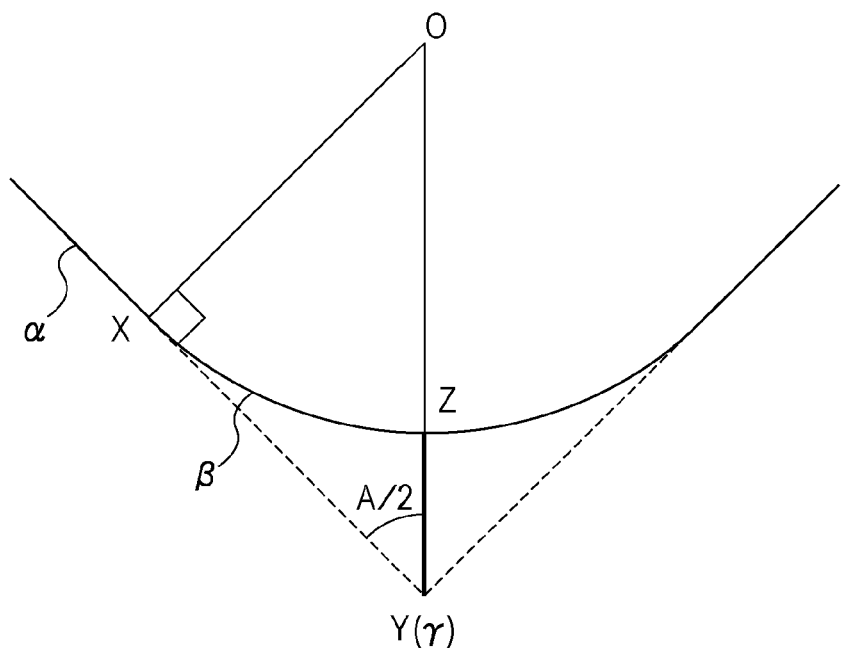

FIGS. 8, 9A and 9B are explanatory views of a wave shape of the RFID tag 100 according to the first embodiment. In FIGS. 8, 9A and 9B, the inlet 101 is simplistically illustrated as a wave, such as a sinusoidal wave.

Here, a wave shape of the inlet 101 is regarded as a wave formed by combining arcs and straight lines. Specifically, as illustrated in FIG. 8, a wave representing a wave shape of the inlet 101 is formed by continuously connecting a straight line α and an arc β.

As illustrated in FIG. 8, as to the wave representing the wave shape of the inlet 101, the amplitude (height), period (pitch), and curvature radius, and peak angle are denoted by H, P, R and A, respectively.

Then, as illustrated in FIG. 9A, when each straight line α contained in the wave is extended by a dotted line, adjacent dotted lines α make contact with each other at a point γ. In this case, a vertical distance L between the respective points γ located above and below the wave is expressed by an equation (1).

$$L = (P/2)/\tan(A/2) \tag{1}$$

FIG. 9B is an enlarged view of part surrounded by a dotted line IXB of FIG. 9A. In FIG. 9B, a central point of the arc β is denoted by O, and an intersection point of a straight line which passes through the central point O and extends in a just downward direction and both the arc β and the straight line α is denoted by X. Furthermore, in FIG. 9B, the point γ of FIG. 9A is denoted by a point Y, and an intersection point of a straight line OY and the arc β is denoted by Z. When the peak angle A is used in addition to these parameters, lengths of the straight lines OY and ZY are expressed by equations (2) and (3), respectively. The equation (3) is given by changing the equation (2).

$$OY = R/\sin(A/2), OZ = R \tag{2}$$

$$ZY = OY - OZ = R/\sin(A/2) - R \tag{3}$$

Then, the height (amplitude) H of the wave shape is expressed by an equation (4).

$$\begin{aligned} H &= L - 2 \cdot ZY \\ &= (P/2)/\tan(A/2) - 2\{R/\sin(A/2) - R\} \\ &= (P/2) \cdot \tan(A/2) - 2 \cdot R/\sin(A/2) + 2R \end{aligned} \tag{4}$$

Accordingly, when the wave shape of the inlet 101 is designed, it is preferable for the height (amplitude) H of the wave shape to be set by using the equation (4).

Next, a description will be given of an expansion and shrinkage rate of the inlet 101, with reference to FIGS. 10A and 10B and FIGS. 11A and 11B. The package 102 of the RFID tag 100 is more likely to be deformed than the inlet 101 is. Therefore, an expansion and shrinkage rate of the RFID tag 100 is deemed to be determined by an expansion and shrinkage rate of the inlet 101.

Figure 10A:
FIGS. 10A and 10B are views illustrating expansion and shrinkage of the inlet.
Figure 10B:
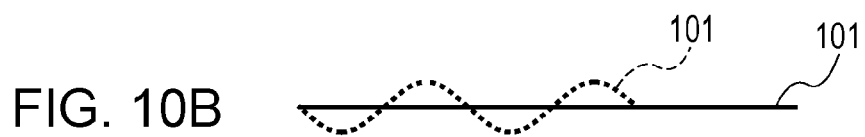
Figure 11A:
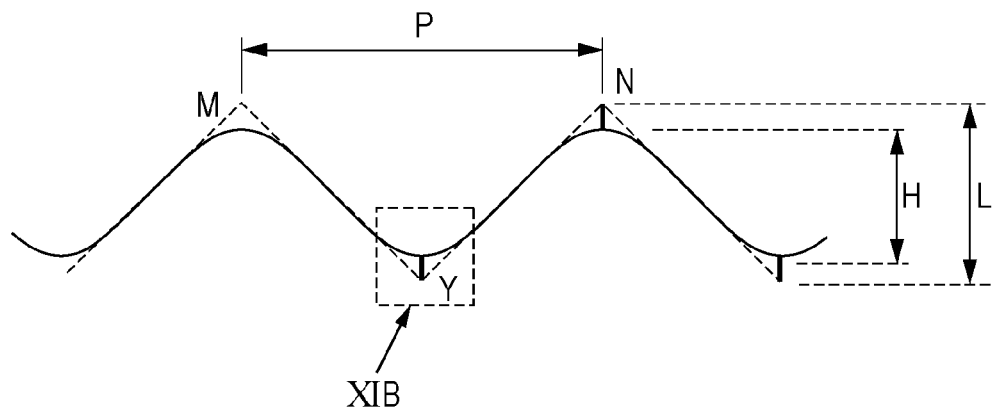
FIGS. 11A and 11B are explanatory views of a method of determining an expansion and shrinkage rate of the inlet.
Figure 11B:
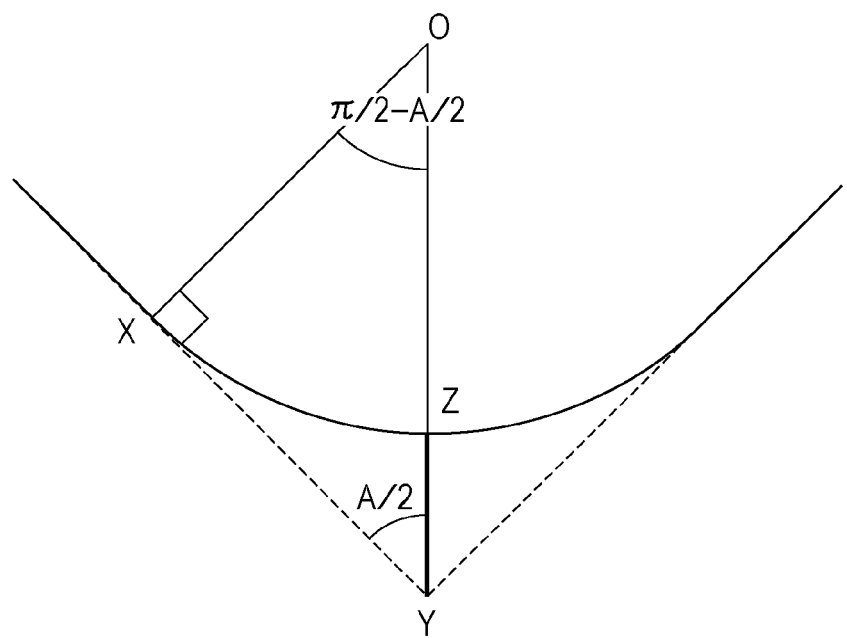

FIGS. 10A and 10B are views illustrating the expansion and shrinkage of the inlet 101. FIGS. 11A and 11B are explanatory views of a method of determining an expansion and shrinkage rate of the inlet 101.

When no force is applied to the inlet 101 processed into a wave shape, the inlet 101 has a length, such as that illustrated in FIG. 10A. Then, when the right end of the inlet 101 of FIG. 10A is pulled in the right direction, the inlet 101 expands linearly as illustrated in FIG. 10B. As is clearly understood from FIGS. 10A and 10B, the inlet 101 is expandable in a longitudinal direction thereof, and once a pulling force is released from the inlet 101 in a state of FIG. 10B, the inlet 101 shrinks until it returns to be in a state of FIG. 10A.

Here, an allowable expansion and shrinkage rate C of the inlet 101 is determined.

As illustrated in FIG. 11A, points M and N are set. These points M and N correspond to the point γ of FIG. 9A.

In FIG. 11A, an equation (5) is satisfied.

$$MY \cdot \sin(A/2) = P/2 \tag{5}$$

By changing the equation (5), an equation (6) is given.

$$MY = (P/2)/\{\sin(A/2)\} \tag{6}$$

FIG. 11B is an enlarged view of part surrounded by a dotted line XIB of FIG. 11A.

In FIG. 11B, an angle between straight lines OX and OY is (π/2−A/2), and an angle between straight lines OY and XY is A/2.

Accordingly, equations (7) and (8) are satisfied.

$$XY \cdot \tan(A/2) = R \tag{7}$$

$$XY = R/\tan(A/2) \tag{8}$$

Here, since a length of an arc XZ is obtained by multiplying a radius of the arc XZ by a central angle thereof, it is determined by $R(\pi/2-A/2)$.

As described above, a period S of the wave representing the wave shape of the inlet 101 is determined by an equation (9).

$$Q = 2MY - 4XY + 4XZ \quad (9)$$
$$= 2\cdot(P/2)/\{\sin(A/2)\} - 4\cdot R/\tan(A/2) + 4\cdot R(\pi/2 - A/2)$$
$$= P/\sin(A/2) - 4\cdot R/\tan(A/2) + 2R(\pi - A)$$

Accordingly, the expansion and shrinkage rate C of the inlet 101 is expressed by an equation (10).

$$C=\{P/\sin(A/2)-4R/\tan(A/2)+2R(\pi-A)\}/P-1 \quad (10)$$

As described above, when the RFID tag 100 according to the first embodiment is fastened to an elastic article, it is preferable for the RFID tag 100 to be designed in consideration of an expansion and shrinkage rate of the inlet 101 which is determined by the equation (10).

Figure 12A:
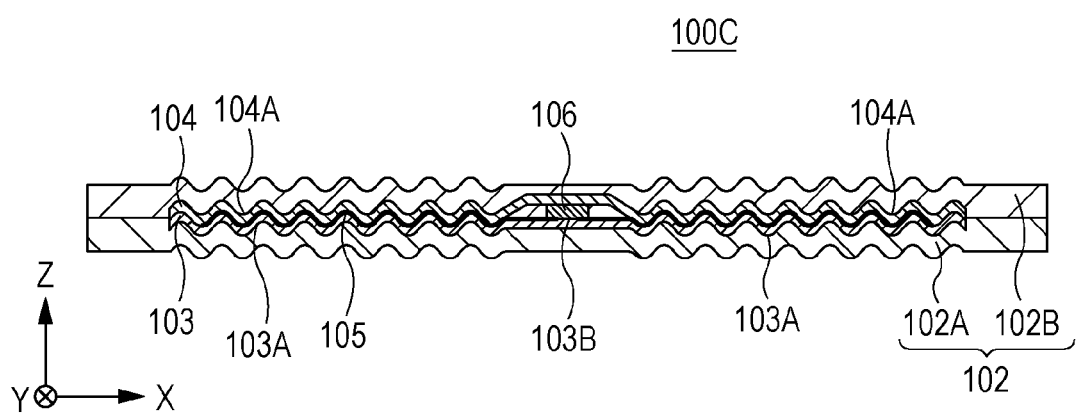
FIGS. 12A and 12B are views illustrating RFID tags according to modifications of the first embodiment.
Figure 12B:
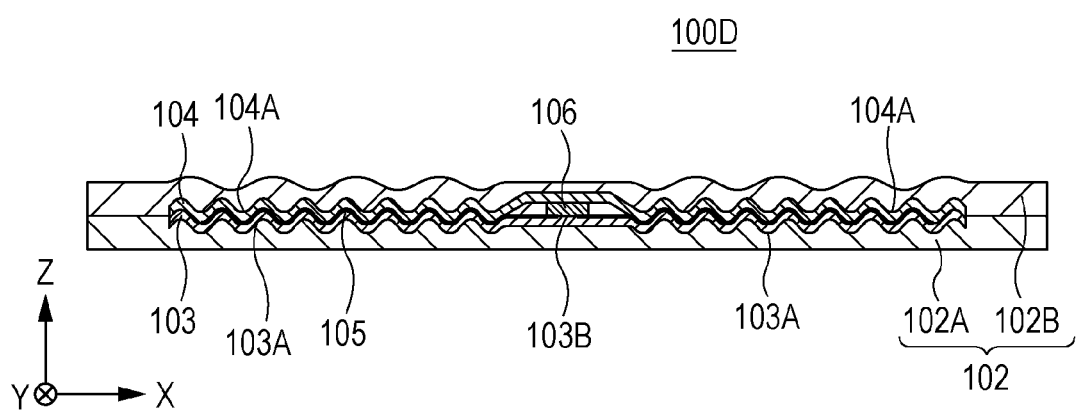

Note that the above description has been given, regarding the case where the RFID tag 100 includes a flat affixed surface (or a flat lower surface); however, the following modifications are also applicable, as illustrated in FIGS. 12A and 12B.

FIGS. 12A and 12B are views illustrating RFID tags 100C and 100D, respectively, according to modifications of the first embodiment.

As illustrated in FIG. 12A, the lower surface of the RFID tag 100C may be formed in a wave shape. Specifically, in the RFID tag 100C, the lower side portion 102A of the package 102 is formed in a wave shape. By forming the lower surface of the RFID tag 100C in a wave shape, the RFID tag 100C is able to be bent along a curved surface more easily.

Meanwhile, in the RFID tag 100D of FIG. 12B, the inlet 101 includes a different wave period from that of the upper side portion 102B of the package 102. Specifically, the wave period of the upper side portion 102 is twice as long as that of the inlet 101. Thus, the inlet 101 and the upper side portion 102B may include different wave periods; however it is preferable for both periods to be related to each other so as to satisfy an integral multiple relationship. By relating the periods of the inlet 101 and the upper side portion 102B to each other, the RFID tag 100D is able to be bent along a curved surface easily.

The above description has been given, regarding the case where the RFID tag 100 is processed into a wave shape. Further, the RFID tag 100 may be configured such that at least the sheets 103 and 104 are provided with projection-depression portions formed in a longitudinal direction thereof.

For example, the upper side portion 102B of the package 102 may include a flat upper surface. Even in this case, the RFID tag 100 is able to be bent along a curved surface. This is because the package 102, made of rubber, is bent more easily than the inlet 101 is.

The above description has been given, regarding the case where the inlet 101 is processed into a wave shape; however the shapes of the sheets 103 and 104 in the inlet 101 are not limited to a wave shape. There is no limitation on the shapes of the sheets 103 and 104 as long as they include projection-depression portions formed in a longitudinal direction thereof. For example, the sheet 103 may be a sheet-shaped PET film having a lower surface on which a plurality of projections are formed in a longitudinal direction thereof, and the sheet 104 may be a sheet-shaped PET film having an upper surface on which a plurality of projections are formed in a longitudinal direction thereof.

Even in this case, the sheets 103 and 104 are able to be bent along a curved surface more easily than a flat PET film is.

The above description has been given, regarding the case where the sheets 103 and 104 of the inlet 101 are processed into a wave shape. However, a configuration of the RFID tag 100 according to the first embodiment is not limited to that has been described above. Instead of the configuration in which the sheets 103 and 104 of the inlet 101 are processed into a wave shape, a configuration in which grooves are formed in the lower surface of the sheet 103 and the upper surface of the sheet 104 may be employed.

It is preferable for the grooves to be formed in the lower surface of the sheet 103 and the upper surface of the sheet 104 along a direction orthogonal to a longitudinal direction in a planar view (or along a Y-axial direction). Here, the direction orthogonal to the longitudinal direction in a planar view (or along the Y-axial direction) refers to a direction along the short side of the RFID tag 100.

Forming the grooves in the above manner enable the sheets 103 and 104 to be bent in the longitudinal direction easily.

Alternatively, such grooves may be formed in a direction forming an angle with the longitudinal direction in a planar view. In other words, a direction along which grooves are formed is not limited to that orthogonal to the longitudinal direction in a planar view (or along the Y-axial direction).

The reason is that it is possible for the sheets 103 and 104 to be bent in the longitudinal direction easily even by forming the grooves in a direction forming an angle with the longitudinal direction in a planar view.

Second Embodiment

FIGS. 13A and 13B are views illustrating an RFID tag 200 according to the second embodiment. Specifically, FIG. 13A is a cross-section view of the whole of the RFID tag 200, and FIG. 13B is an enlarged view of part surrounded by a dotted line XIIIB of FIG. 13A. The cross-section of the RFID tag 200 in FIG. 13A corresponds to that of the RFID tag 100 according to the first embodiment in FIG. 3A. In FIGS. 13A and 13B, the dimensions of the RFID tag 200 are defined by an orthogonal coordinate system, more specifically, an XYZ coordinate system.

The RFID tag 200 according to the second embodiment includes an inlet 101 and a package 202. The inlet 101 is the same as that of the first embodiment, and therefore a description thereof will be omitted. In the RFID tag 200, the lower surface of the package 202 is to be affixed to an article.

The package 202 differs from the package 102 of the first embodiment, in that the upper surface thereof is provided with grooves 202C formed so as to extend along a direction orthogonal to a longitudinal direction in a planar view (or along a Y-axial direction in FIG. 13A), in place of the wave shape. Except for this difference, the package 202 includes the same structure as the package 102 of the first embodiment does. For this reason, the following description of the second embodiment is focused on the difference from the first embodiment. Here, the direction orthogonal to the longitudinal direction in a planar view (or along the Y-axial direction) refers to a direction along the short side of the RFID tag 200.

The package 202 includes a lower side portion 202A and an upper side portion 202B. The lower side portion 202A includes the same structure as the lower side portion 102A of the first embodiment does.

The upper surface of the upper side portion 202B is provided with a plurality of grooves 202C formed along the short side. The grooves 202C are formed at locations where the upper surface of the sheet 104 in the inlet 101 is depressed. Specifically, the locations at which the grooves 202C are formed correspond to a wave period of the inlet 101. The grooves 202C are an example of a third groove portion.

The grooves 202C, as described above, may be formed by subjecting the upper surface of the upper side portion 202B to, for example, machine processing using a cutter and the like or irradiation processing using a laser.

The lower side portion 202A and the upper side portion 202B are arranged covering the lower and upper surfaces, respectively, of the inlet 101 which are processed into a wave shape. Each of the lower side portion 202A and the upper side portion 202B is larger than the inlet 101 in a planar view. The lower side portion 202A and the upper side portion 202B are joined together through the respective parts which surround the inlet 101 by, for example, being thermally fused. As a result, the package 202 entirely covers the inlet 101.

When the RFID tag 200, as described above, according to the second embodiment is fastened to, for example, the side surface of a cylindrical article, it is bent along the curved surface, similar to the RFID tag 100 according to the first embodiment. This is because the grooves 202C which are formed on the upper surface of the upper side portion 202B in the package 202 helps the upper side portion 202B be bent in the longitudinal direction.

Consequently, the second embodiment makes it possible to provide a highly durable RFID tag, similar to the first embodiment.

Moreover, it is assumed that the RFID tag 200 according to the second embodiment is fastened to the curved surface of an elastic article. When this article expands or shrinks, the inlet 101 processed into a wave shape absorbs the expansion or shrinkage by being deformed as long as the expansion or shrinkage occurs in the longitudinal direction, similar to the RFID tag 100 according to the first embodiment. In this case, the upper side portion 202B of the package 202 absorbs the expansion or shrinkage in conjunction with the inlet 101 by increasing or decreasing the widths of the grooves 202C in the longitudinal direction.

Consequently, the second embodiment also makes it possible to provide a highly durable RFID tag that is capable of being fastened to the curved surface of an elastic article.

Figure 14A:
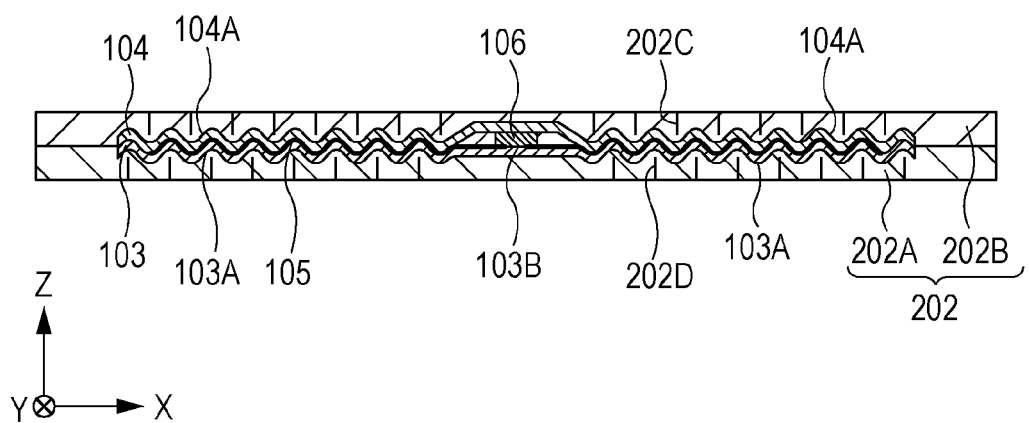
FIGS. 14A and 14B are views illustrating RFID tags according to modifications of the second embodiment.
Figure 14B:
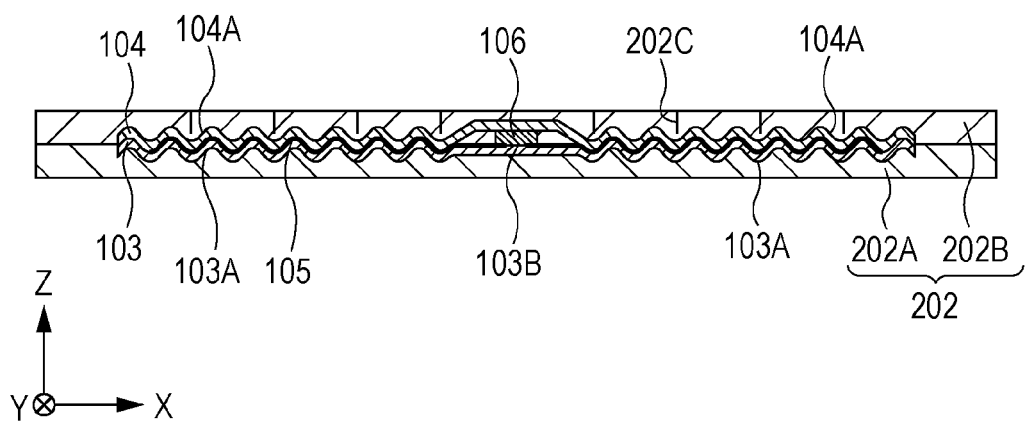

Note that the above description has been given, regarding the case where the RFID tag 200 includes a flat affixed surface (or a flat lower surface); however the following modifications are also applicable, as illustrated in FIGS. 14A and 14B.

FIGS. 14A and 14B are views illustrating RFID tags 200A and 200B, respectively, according to modifications of the second embodiment.

As illustrated in FIG. 14A, the RFID tag 200A may include a lower surface on which a plurality of grooves 202D are formed. In other words, in the RFID tag 200A, the grooves 202D are formed on the lower surface of the lower side portion 202A in the package 202. Forming the grooves 202D in the lower surface of the RFID tag 200 further helps the RFID tag 200 be bent along a curved surface.

On the other hand, in the RFID tag 200B illustrated in FIG. 14B, a wave period of the inlet 101 differs from a forming period of the grooves 202C in the upper side portion 202B of the package 202. In more detail, the forming period of the grooves 202C in the upper side portion 202 is twice as long as the wave period of the inlet 101. Thus, the wave period of the inlet 101 may differ from the forming period of the grooves 202C in the upper side portion 202B; however it is preferable for the wave period and the forming period to be related to each other so as to satisfy an integral multiple relationship. By relating the wave period of the inlet 101 and the forming period of the grooves 202C in the upper side portion 202B, the RFID tag 200B is able to be bent along a curved surface more easily.

The above description has been given, regarding the case where the grooves 202C are formed in a direction orthogonal to the longitudinal direction in a planar view (or along the Y-axial direction). However, the groove 202C may also be formed in a direction forming an angle with the longitudinal direction in a planar view. In other words, a direction along which grooves are formed is not limited to that orthogonal to the longitudinal direction in a planar view (or along the Y-axial direction).

The reason is that it is possible for the package 202 to be bent in the longitudinal direction easily even by forming the grooves 202C in a direction forming an angle with the longitudinal direction in a planar view.

Up to this point, the RFID tags according to the embodiments have been described. However, the descriptions are not limited to those that have been concretely disclosed, and various modifications and variations thereof are applicable without departing from the scope of the claims.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:
1. An RFID tag comprising:
  a first sheet portion including a first projection-depression portion formed in a longitudinal direction or a first groove portion formed in a direction forming an angle with the longitudinal direction, the first projection-depression portion being provided to an upper and lower surfaces of the first sheet portion,
  an antenna formed on a surface of the first sheet portion, the antenna being flexible and elastic;
  an integrated circuit chip electrically connected to the antenna;
  a second sheet portion including a second projection-depression portion formed in the longitudinal direction or a second groove portion formed in a direction forming an angle with the longitudinal direction, the second projection-depression portion being provided to an upper and rear surfaces of the second sheet portion, the antenna and the integrated circuit chip being covered between the first sheet portion and the second sheet portion, and
  a package member covering the first sheet portion and the second sheet portion, the package member being flexible and elastic.
2. The RFID tag according to claim 1, wherein
  a phase of the first projection-depression portion or the first groove portion corresponds to a phase of the second projection-depression portion or the second groove portion.
3. The RFID tag according to claim 1, wherein
  the first projection-depression portion or the second projection-depression portion is at least part of the first sheet portion or the second sheet portion which is bent in a wave shape.

4. The RFID tag according to claim 1, wherein the first sheet portion includes a flat portion at a location corresponding to the IC chip.

5. The RFID tag according to claim 1, wherein the package member includes a third projection-depression portion or a third groove portion on a first outer surface portion or a second outer surface portion, the third projection-depression portion being formed in the longitudinal direction, the third groove portion being formed in a direction forming an angle with the longitudinal direction, the first outer surface portion being a side of the package member which covers the first sheet portion, the second outer surface portion being a side of the package member which covers the second sheet portion.

6. The RFID tag according to claim 5, wherein the package member includes the third projection-depression portion or the third groove portion on both the first outer surface portion and the second outer surface portion.

7. The RFID tag according to claim 5, wherein a phase of the third projection-depression portion or the third groove portion corresponds to a phase of the first projection-depression portion or the second projection-depression portion, or a phase of the first groove portion or the second groove portion.

8. The RFID tag according to claim 5, wherein the third projection-depression portion is at least part of the package member which is bent in a wave shape.

9. An RFID tag comprising:
a first sheet portion including a first projection-depression portion formed in a longitudinal direction or a first groove portion formed in a direction forming an angle with the longitudinal direction, the first projection-depression portion being provided to upper and lower surfaces of the first sheet portion;
an antenna formed on a surface of the first sheet portion, the antenna being flexible, elastic, and plate;
an integrated circuit chip electrically connected to the antenna;
a second sheet portion including a second projection-depression portion formed in the longitudinal direction or a second groove portion formed in a direction forming an angle with the longitudinal direction, the second projection-depression portion being provided to an upper and rear surfaces of the second sheet portion, the antenna and the integrated circuit chip being covered between the first sheet portion and the second sheet portion, and
a package member covering the first sheet portion and the second sheet portion, the package member being flexible and elastic.

* * * * *